Patented Oct. 21, 1952

2,615,054

UNITED STATES PATENT OFFICE 2,615,054

VINYL CHLORIDE PREPARATION

Hoke S. Miller, Stamford, Conn., assignor to Air Reduction Company, Inc., New York, N. Y., a corporation of New York No Drawing. Application December 17, 1947, Serial No. 792,335

6 Claims. (Cl. 260—656)

This invention relates to a method for the preparation of a vinyl halide by the reaction of acetylene and the appropriate hydrogen halide.

Various methods for the preparation of vinyl halides by the reaction of acetylene and hydrogen halides have been described in the art, the reaction being effected by contacting at a somewhat elevated temperature a reaction mixture of the reactants with a catalyst containing a mercuric salt. When the aforementioned methods are practiced, the catalyst becomes less effective with the passage of time, and hence the operation must be suspended at intervals in order that the catalyst may be changed or its activity restored by appropriate treatment. The interruption of the operation for the purpose of changing or reactivating the catalyst naturally decreases the output from a given piece of equipment and thus adds to the cost of the vinyl halide. Furthermore, the cost of the catalyst or the expense of revivifying it likewise adds to the cost of the product. Therefore, any catalytic method for the preparation of a vinyl halide which would increase the catalyst life would be a valuable contribution to the art of vinyl halide preparation.

It is therefore the primary object of the present invention to provide a method for the catalytic reaction of acetylene and a hydrogen halide to form a vinyl halide, in which method the catalyst need be changed at substantially less frequent intervals.

The aforementioned object is accomplished in accordance with the method of the present invention by reacting the hydrogen halide and acetylene with the reaction mixture containing water vapor. The present method requires that the reaction mixture contain water vapor, and in that respect differs from the processes of the prior art.

The following examples illustrate in detail the practice and advantage of the method of the present invention, and are to be considered not limitative thereof.

Example I

The catalyst was prepared in the usual manner by impregnating a sample of activated charcoal with 8 gms. of mercuric chloride per 100 gms. of the sample of activated charcoal. 40 gms. of the catalyst was charged into a ⅞ in. diameter quartz reactor. The reactor was then swept with nitrogen, and at the same time the temperature of the catalyst was raised by means of a suitable electrical heater until the temperature at the half depth thereof was 120° C. The nitrogen was then turned off, and a mixture of 0.26 cu. ft. per hour of dry hydrogen chloride and 0.26 cu. ft. per hour of acetylene which had been saturated by passing it at normal temperatures through a water scrubber was passed through the reactor. The exit gases from the reactor entered a water-cooled condenser, a water scrubber to remove the unreacted hydrogen chloride, a column containing a water absorbent in lump form, and finally a Dry Ice trap which liquified the vinyl chloride.

When the procedure just described was practiced over a period of eight days using a reaction temperature of about 185° C. at the half depth of the catalyst bed, an overall average of 90.8% of the reactants was converted to vinyl chloride and 83.0% of the reactants was being converted to vinyl chloride at the end of the eighth day of operation. On the other hand, when the aforementioned procedure was practiced using a fresh batch of the same catalyst and similar reaction conditions, but omitting the step of saturating the acetylene with water vapor, the conversion of the reactants to vinyl chloride over a period of eight days averaged only 54.5% and the rate of conversion of the reactants to vinyl chloride at the end of the eighth day of operation was less than 12%.

Example II 100 cc. of a catalyst prepared by impregnating a sample of activated coconut charcoal with 8 gms. of mercuric chloride and 0.5 gm. of thorium chloride per 100 gms. of the sample of activated charcoal was placed in a ⅞ in. diameter quartz tube which was heated by an electric furnace to 120° C. When 36% by weight aqueous hydrochloric acid was vaporized at the rate of 18.2 gms. per hour, the vapors then admixed with a stream of acetylene flowing at the rate of 0.3 cu. ft. per hour, and the combined gaseous mixture was passed through the quartz tube, 96% of the hydrochloric acid vaporized was converted to vinyl chloride.

Various modifications may be made in the procedure of the specific examples in practicing a method falling within the scope of the present invention. Thus, in place of the particular salts employed in preparing the catalyst, there may be substituted other mercuric salts, such as mercuric phosphate, mercuric sulfate, $HgCl_2 \cdot CaCl_2$, $HgCl_2 \cdot BaCl_2$

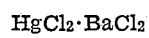, $HgCl_2 \cdot 2BaCl_2$, $HgCl_2 \cdot 2SrCl_2$, $HgCl_2 \cdot CaCl_2 \cdot BaCl_2$, etc. Moreover, when one of the other hydrogen halides (viz, hydrogen fluoride, hydrogen bromide or hydrogen iodide) is employed as a reactant, the salt of the particular halide chosen corresponding to one of the aforementioned chloride salts, as well as mercuric phosphate and mercuric sulfate, may be employed in preparing the catalyst. For example, when hydrogen bromide is employed as a reactant, $HgBr_2$, a mixture of mercuric bromide and thorium bromide, mercuric phosphate, mercuric sulfate, $$HgBr_2 \cdot CaBr_2$$

$HgBr_2 \cdot BaBr_2$, $HgBr_2 \cdot 2BaBr_2$, $HgBr_2 \cdot 2SrBr_2$, $HgBr_2 \cdot CaBr_2 \cdot BaBr_2$, etc. may be used in the catalyst preparation, and when hydrogen iodide is employed as a reactant $HgI_2$, a mixture of mercuric iodide and thorium iodide, mercuric phosphate, mercuric sulfate, $HgI_2 \cdot CaI_2$, $HgI_2 \cdot BaI_2$, $HgI_2 \cdot 2BaI_2$, $HgI_2 \cdot 2SrI_2$, $HgI_2 \cdot CaI_2 \cdot BaI_2$, etc. may be similarly used. Furthermore, the activated charcoal used as a catalyst support may be replaced by other substantially inert carriers of high surface activity, such as silica gel, activated alumina which has been treated with a mineral acid (e. g., HCl, $H_2SO_4$, $H_3PO_4$, etc.) and thereafter washed with water to remove free acid and soluble salts, clays which have been similarly treated, etc. Also, hydrogen bromide, hydrogen iodide or hydrogen fluoride may be used in practicing the present method. The relative amounts of acetylene and hydrogen halide employed in preparing the reaction mixture is not critical, since either excess acetylene or excess hydrogen halide may be recycled for further reaction.

The reaction temperature may be varied within a wide range in practicing the method of the present invention. It is preferred, however, that reaction temperatures within the range from about 100 to about 250° C. be used, although somewhat higher and somewhat lower reaction temperatures are operable.

Example I illustrates an embodiment of the present invention in which the water vapor was introduced into the reaction mixture by passing the acetylene through water, thereby substantially saturating the acetylene with water vapor at atmospheric pressure and room temperature. If desired, both the hydrogen halide and acetylene, separately or in admixture with each other, may be similarly saturated with water vapor, the saturation of hydrogen iodide with water vapor being effected at a slightly elevated temperature (e. g., 50° C.) at which hydrogen iodide is in the vapor phase. The essential feature of the present invention is, however, that the reaction mixture contain water vapor, and it is immaterial whether such water vapor be intentionally added to the reaction mixture or be originally present in the acetylene and/or hydrogen halide employed in preparing the reaction mixture.

I claim:

1. In a continuous process for preparing vinyl chloride in which hydrogen chloride is reacted with acetylene in vapor phase by passing a gaseous mixture of the hydrogen chloride and acetylene in contact with a mercuric chloride catalyst at an elevated temperature, the improvement which comprises the step of continuously introducing into the reaction zone an amount of water vapor about equal to that required to saturate the acetylene gas under normal temperature and pressure conditions.

2. The method of claim 1 in which the reaction is carried out at a temperature within the range of 100°–250° C.

3. The method of claim 1 in which the reaction is carried out at a temperature of approximately 120° C.

4. The method of claim 1 in which the acetylene is saturated with water vapor under normal temperature and pressure conditions prior to passing it in contact with the catalyst.

5. The method of claim 1 in which the hydrogen chloride and acetylene are mixed in substantially equal volumes.

6. In a continuous process of preparing vinyl chloride in which acetylene and hydrogen chloride are passed over a mercuric chloride catalyst maintained at an elevated temperature, the improvement which comprises continuously introducing at least one of the reactant gases into the reaction zone while saturated with water vapor.

HOKE S. MILLER.

REFERENCES CITED

The following references are of record in the file of this patent:

UNITED STATES PATENTS

| Number | Name | Date |
|---|---|---|
| 1,934,324 | Perkins | Nov. 7, 1933 |
| 2,225,635 | Japs | Dec. 24, 1940 |